(12) United States Patent
Varsavsky Waisman-Diamond et al.

(10) Patent No.: US 8,910,300 B2
(45) Date of Patent: Dec. 9, 2014

(54) SECURE TUNNELING PLATFORM SYSTEM AND METHOD

(75) Inventors: Martin Varsavsky Waisman-Diamond, Madrid (ES); Gonzalo Julián Bécares Fernández, Madrid (ES); Xabier Iurgi Arginzoniz Cebreiro, Madrid (ES); Juan Manuel Muñoz Castro, Madrid (ES); Pablo Martin Medrano, Madrid (ES)

(73) Assignee: Fon Wireless Limited, London (GB)

( * ) Notice: Subject to any disclaimer, the term of this patent is extended or adjusted under 35 U.S.C. 154(b) by 183 days.

(21) Appl. No.: 13/339,807

(22) Filed: Dec. 29, 2011

(65) Prior Publication Data

US 2012/0204241 A1      Aug. 9, 2012

Related U.S. Application Data

(60) Provisional application No. 61/428,620, filed on Dec. 30, 2010, provisional application No. 61/559,460, filed on Nov. 14, 2011.

(51) Int. Cl.
*G06F 21/00* (2013.01)
*H04L 29/06* (2006.01)
*H04L 29/12* (2006.01)
*H04W 12/06* (2009.01)

(52) U.S. Cl.
CPC ........ *H04L 63/083* (2013.01); *H04L 29/12367* (2013.01); *H04L 61/2514* (2013.01); *H04L 63/1425* (2013.01); *H04L 63/30* (2013.01); *H04W 12/06* (2013.01); *H04L 63/162* (2013.01)
USPC ............... 726/27; 726/26; 726/5; 713/150

(58) Field of Classification Search
USPC .................................................. 726/5, 26, 27
See application file for complete search history.

(56) References Cited

U.S. PATENT DOCUMENTS 6,184,710 B1 * 2/2001 Mendel .......................... 326/41
6,298,383 B1 10/2001 Gutman et al. ................ 709/229

(Continued)

FOREIGN PATENT DOCUMENTS

| CN | 101399671 | 4/2009 |
| EP | 1 104 133 A1 | 5/2001 |

(Continued)

OTHER PUBLICATIONS

International Search Report and Written Opinion dated Feb. 1, 2013.

(Continued)

*Primary Examiner* — William Powers
(74) *Attorney, Agent, or Firm* — Siritzky Law, PLLC

(57) ABSTRACT

Disclosed is a system and method for receiving, by a wireless gateway device from a user computing device, a request for network access. In an embodiment, the request is formatted to comply with a different communication protocol, and transmitted to a authentication computing device. The gateway device receives a reply from the authentication computing device that grants the request. The reply is transmitted by the wireless gateway device and to the user computing device. A first communication pathway is established between the authentication computing device and the user computing device, and a request for access to at least one other computing device is received by the authentication device. The request is forwarded, and a reply granting the request is received and forwarded to the user computing device.

18 Claims, 13 Drawing Sheets

(56) References Cited

U.S. PATENT DOCUMENTS

| | | | |
|---|---|---|---|
| 6,430,619 B1 | 8/2002 | Sitaraman et al. | 709/225 |
| 6,795,700 B2 | 9/2004 | Karaoguz et al. | |
| 6,842,770 B1* | 1/2005 | Serlet et al. | 709/203 |
| 6,934,530 B2 | 8/2005 | Engelhart | |
| 6,950,628 B1 | 9/2005 | Meier et al. | |
| 6,957,069 B2 | 10/2005 | Shah et al. | |
| 6,957,086 B2 | 10/2005 | Bahl et al. | |
| 6,961,575 B2 | 11/2005 | Stanforth | |
| 7,251,827 B1* | 7/2007 | Guo et al. | 726/8 |
| 7,263,076 B1 | 8/2007 | Leibovitz | 370/310 |
| 7,296,078 B2 | 11/2007 | Sanchez Herrero et al. | 709/229 |
| 7,302,229 B2 | 11/2007 | Riddles | |
| 7,568,218 B2 | 7/2009 | Garg et al. | 726/4 |
| 7,924,780 B2 | 4/2011 | Waisman-Diamond | |
| 7,995,993 B1 | 8/2011 | Waisman-Diamond | |
| 8,091,116 B2 | 1/2012 | Kutt et al. | 726/2 |
| 8,179,840 B2 | 5/2012 | O'Neill | 370/328 |
| 8,213,934 B2 | 7/2012 | Tsirtsis et al. | 455/435.1 |
| 8,266,266 B2* | 9/2012 | Short et al. | 709/223 |
| 8,319,835 B2 | 11/2012 | Azuma et al. | 348/207.1 |
| 8,332,923 B2 | 12/2012 | Oba et al. | 726/10 |
| 2001/0053683 A1 | 12/2001 | Murayama et al. | |
| 2002/0035617 A1* | 3/2002 | Lynch et al. | 709/219 |
| 2002/0075844 A1 | 6/2002 | Hagen | 370/351 |
| 2002/0138635 A1 | 9/2002 | Redlich et al. | 709/229 |
| 2003/0051041 A1 | 3/2003 | Kalavade et al. | |
| 2004/0052223 A1 | 3/2004 | Karaoguz et al. | |
| 2004/0122959 A1 | 6/2004 | Lortz | 709/229 |
| 2004/0133687 A1 | 7/2004 | Yamaguchi et al. | |
| 2004/0141617 A1 | 7/2004 | Volpano | |
| 2005/0021781 A1 | 1/2005 | Sunder et al. | |
| 2005/0050352 A1 | 3/2005 | Narayanaswami et al. | |
| 2005/0096048 A1 | 5/2005 | Clare et al. | 455/433 |
| 2005/0177515 A1 | 8/2005 | Kalavade et al. | 705/52 |
| 2005/0204037 A1 | 9/2005 | Levy | |
| 2005/0220106 A1 | 10/2005 | Raverdy et al. | |
| 2005/0223086 A1 | 10/2005 | Raverdy et al. | |
| 2005/0232242 A1* | 10/2005 | Karaoguz et al. | 370/352 |
| 2005/0232283 A1 | 10/2005 | Moyer et al. | |
| 2005/0233740 A1 | 10/2005 | Jiang | |
| 2005/0250448 A1 | 11/2005 | Knauerhase et al. | |
| 2005/0260972 A1 | 11/2005 | Karaoguz et al. | |
| 2006/0041931 A1 | 2/2006 | Boxall et al. | |
| 2006/0223527 A1 | 10/2006 | Lee et al. | |
| 2006/0239254 A1* | 10/2006 | Short et al. | 370/352 |
| 2007/0008885 A1 | 1/2007 | Bonner | |
| 2007/0087756 A1 | 4/2007 | Hoffberg | |
| 2007/0094401 A1 | 4/2007 | Gagne et al. | 709/229 |
| 2007/0226320 A1* | 9/2007 | Hager et al. | 709/219 |
| 2007/0254624 A1* | 11/2007 | Le Creff et al. | 455/404.1 |
| 2008/0059445 A1* | 3/2008 | De Bellis | 707/4 |
| 2009/0172798 A1 | 7/2009 | Upp | 726/10 |
| 2009/0279492 A1 | 11/2009 | Montemurro et al. | 370/329 |
| 2010/0017525 A1* | 1/2010 | Albert et al. | 709/229 |
| 2010/0106572 A1 | 4/2010 | van Hoff et al. | 705/14.4 |
| 2010/0235895 A1 | 9/2010 | Grassley et al. | 726/7 |
| 2010/0263022 A1 | 10/2010 | Wynn et al. | 726/3 |
| 2011/0047603 A1 | 2/2011 | Gordon et al. | 726/5 |
| 2011/0088003 A1 | 4/2011 | Swink et al. | 715/863 |
| 2011/0154454 A1 | 6/2011 | Frelechoux | 726/5 |
| 2011/0255459 A1 | 10/2011 | Gupta et al. | 370/312 |
| 2012/0054840 A1 | 3/2012 | Gupta et al. | 726/5 |
| 2012/0149334 A1 | 6/2012 | Zhang et al. | 455/411 |
| 2012/0158979 A1 | 6/2012 | Lee et al. | 709/229 |

FOREIGN PATENT DOCUMENTS

| | | |
|---|---|---|
| EP | 1 241 903 | 9/2002 |
| EP | 1 357 720 | 10/2003 |
| EP | 1 411 676 | 4/2004 |
| EP | 1 550 264 | 7/2005 |
| EP | 1 643 719 | 4/2006 |
| EP | 2 051 473 A1 | 4/2009 |
| GB | 2440193 | 1/2008 |
| JP | 2007-049503 | 2/2007 |
| JP | 2007-281919 | 10/2007 |
| WO | WO 03/047294 | 6/2003 |
| WO | WO 2007/093216 | 8/2007 |
| WO | WO 2008/040697 | 4/2008 |
| WO | WO 2009/114976 | 9/2009 |
| WO | WO 2010/019084 A1 | 2/2010 |
| WO | WO 2012/119450 | 9/2012 |

OTHER PUBLICATIONS

A. Perez-Mendez et al. "GSS-EAP pre-authentication for Kerberos." *ABFAB*, Mar. 2012, Accessed Oct. 10, 2013, <http://tools.ietf.org/pdf/draft-perez-abfab-eap-gss-preauth-01.pdf.

HighBeam Research, "Locals Surf Wi-Fi Wave: Businesses Give Away Web Access to Entice Paying Customers", HighBeam Research, copyright 2005, 4 pages.

http://www.pbs.org/newshour/bb/cyberspace/July-dec05/philadelphia_11-22.html, 6 pages. Nov. 22, 2005.

http://www.bwianews.com/, 27 pages. Dec. 1, 2005.

http://www.cnn.com/2003/TECH/internet/12/11/sprj.ws.Wi-Fi.city.ap/, 2 pages.

"Air Marshal version 2.0—Captive Portal System—Wireless Hotspots Wired Networks Device Authentication." *IEA Software, Inc.* Feb. 13, 2013. <http://www.iea-software.com/products/airmarshall.cfm>.

"Air Marshal—Authentication Gateway Version 2.0.40 Users Guide", *IEA Software, Inc.*

"Cellular Data Offload and Extending Wi-Fi Coverage with Devicescape Easy WiFi Case Study", *Devicescape Software, Inc.*, Oct. 2010.

Notice of Reasons for Rejection dated Jun. 5 2012 in corresponding Japanese Patent Application No. 2011-102216 (with English language translation).

International Search Report and Written Opinion dated Mar. 6, 2012 in corresponding International Application No. PCT/EP2011/074318.

* cited by examiner

SECURE TUNNELING PLATFORM SYSTEM AND METHOD

CROSS-REFERENCE TO RELATED APPLICATIONS

This application relates to U.S. Provisional Patent Application Ser. No. 61/428,620, filed Dec. 30, 2010 and entitled SECURE TUNNELING PLATFORM SYSTEM AND METHOD, and to U.S. Provisional Patent Application Ser. No. 61/559,460, filed Nov. 14, 2011, and entitled SECURE TUNNELING PLATFORM SYSTEM AND METHOD, the entire contents of each of which are incorporated herein by reference.

BACKGROUND

1. Field

The present application relates, generally, to network bandwidth sharing and, more particular, to identifying users thereof.

2. Description of the Related Art

Sharing bandwidth, such as via Wi-Fi, is a practical solution that has benefits such as described in commonly assigned U.S. Pat. No. 7,924,780. Users who access communication networks, such as the Internet, via Wi-Fi often share a public Internet protocol ("IP") address. For example, a respective Internet Service Provider ("ISP") provides Internet access via one or a limited number of IP addresses. The Internet bandwidth is made available via a Wi-Fi access point. User A operates an IPOD TOUCH, and locates and accesses the Wi-Fi service to access a web page on the Internet. User B operates a laptop computer and locates the same Wi-Fi service to access a different web page on the Internet. The devices operated by User A and User B share the single public IP address provided by the ISP. In this example, it is impossible to determine which user (User A or User B) accessed which Internet web page because both users shared the same public IP address.

In the above example, two users operate different computing devices and access two different web pages at the same time. Unfortunately, the ISP can only detect the one IP address that is shared by and accessed both users. Therefore, the respective users cannot be identified.

SUMMARY

A system and method are disclosed that include storing address information representing respective endpoints on one or more networks. A first computing device is provided a first network address, which is associated with a second network address. A secure pathway is established over a network between the first computing device and at least one processor, and a pathway network address is provided for the secure pathway. A first communication session via the secure pathway is provided between the first user computing device and the at least one processor, and electronic authentication information is received from the first computing device for access to at least one other computing device. The authentication information is sent to an authenticating device, and, when confirmed, the first user computing device is authorized to access the other computing device(s). Each of the pathway network address, the first respective network address, the second network address, and the at least one other computing device is stored in the one or more databases.

BRIEF DESCRIPTION OF THE DRAWINGS

For the purpose of illustrating the invention, there is shown in the drawings several forms, which are presently preferred, it being understood, however, that the invention is not limited to the precise arrangements and instrumentalities shown. The features and advantages of the present invention will become apparent from the following description of the invention that refers to the accompanying drawings, in which.

DESCRIPTION OF THE EMBODIMENTS

Figure 1:
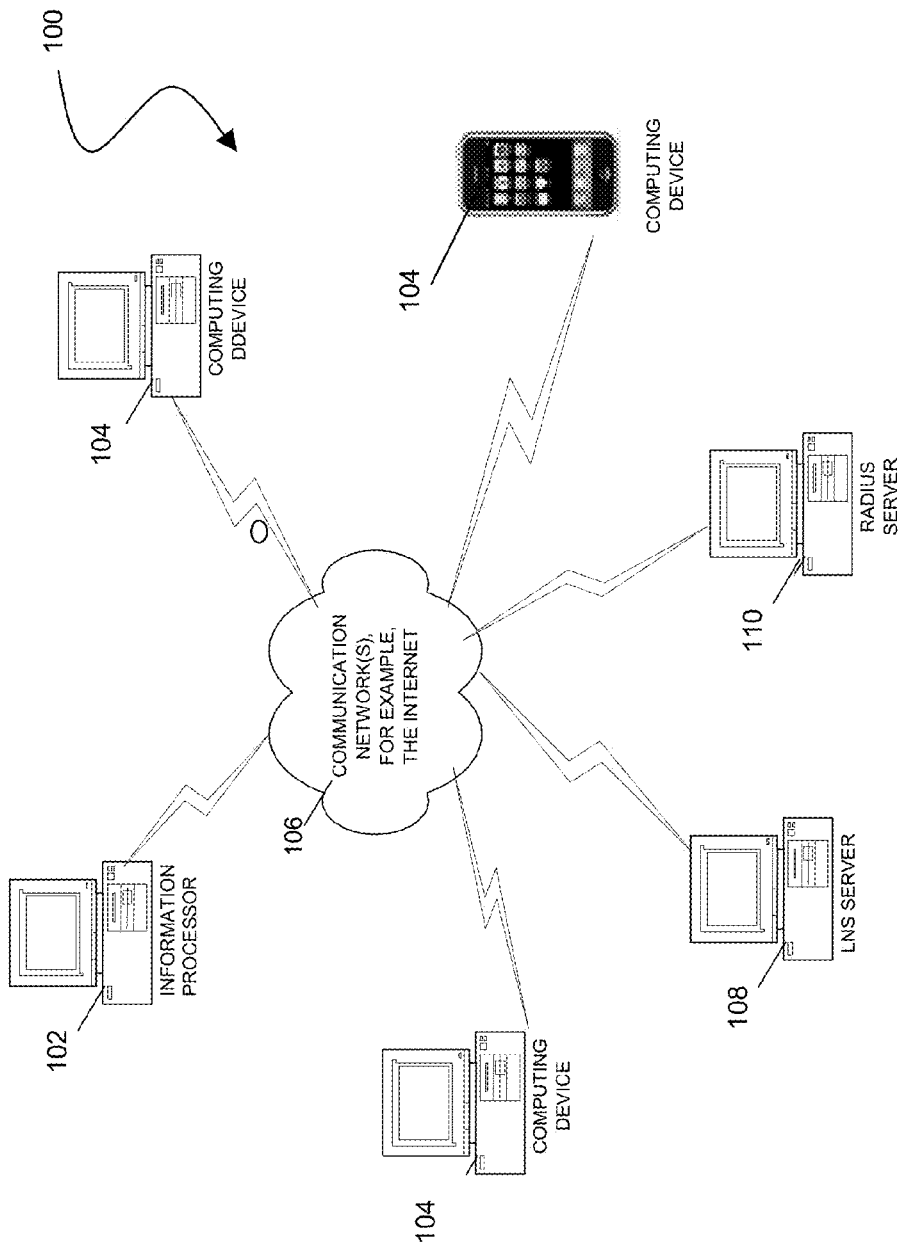
FIG. 1 illustrates an example hardware arrangement in accordance with an embodiment of the present application.

A system and method are provided for identifying respective users that access a communication network via Wi-Fi or other sharing of bandwidth, even when both users share the bandwidth, substantially simultaneously. The system and method in accordance with the teachings herein further provide identification and disclosure of respective users that use bandwidth provided via Wi-Fi service, including bandwidth that is provided on a single or a limited number of shared public IP addresses.

In an embodiment, one or more disclosure services are provided to identify a user who is accessing to the Internet, given the public IP address and port that has been assigned to the connection. In addition to the systems and methods set forth and described in commonly assigned U.S. Pat. No. 7,924,780 and U.S. Pat. No. 7,995,993, the entire contents of each of which are hereby incorporated by reference, users who register with an information processor to share bandwidth and be entitled to access other registered users' bandwidth at no additional charge are assigned unique respective user names. As described herein, accounting logs may be kept that represent sessions and connections (network address translation ("NAT")), for example, for disclosure purposes. For example, accounting is provided for "PPP" sessions (which may be generated by Remote Authentication Dial In User Service ("RADIUS") servers), "captive portal" sessions (which may be generated by RADIUS servers) and for NAT translations accounting (generated by L2TP Network Server ("LNS"), which may be a computer, router, or other suitable device).

The present application includes a network tunneling platform that provides a device, such as a router, computer or other suitable hardware, that is configured to provide user identification over a communication network, even when a user the user's computing device is behind one or multiple NAT services. As shown and described in commonly assigned U.S. Pat. No. 7,924,780, registered user identification information is received and stored in one or more databases. Registered network users are subscribers and, therefore, can be identified unequivocally. For example, users are authenticated by providing a username and password, and may be authorized to share other user's network bandwidth at no additional cost, or for a small fee, depending upon the user's authenticated status. The teachings herein provide for relating the user's connection IP address and TCP/UDP port with the user's authentication information (e.g., user name and password) in order to identify the user.

Users identification capability provided in accordance with the teachings herein provides compliance with the security policies and legal requirements of even very strict measures implemented by an Internet service provider.

In an embodiment, user identification information is provided via a PPP session that is provided via a layer 2 tunneling protocol ("L2TP") tunnel. Each user session is established via a L2TP tunnel, which provides an independent Internet protocol ("IP") address to each PPP tunnel and, accordingly, to each user. User credentials and a respective session IP address is logged by, for example, a RADIUS server that may also support authentication and accounting processes.

The tunneling embodiments in accordance with the teachings herein also supports an environments that have a limited number of available IP addresses. Public IP address conservation may be provided by assigning a private IP address to each respective user. In this embodiment, respective private IP addresses are translated, for example, via one or more network addresses translation ("NAT") servers, to one or more public IP addresses before network traffic reaches the Internet. In an embodiment, multiple private IP addresses are NATed with a single public IP address (also called public address translation ("PAT") or NAT overload). Thus, a feature is provided that translates one IP address into another. In an embodiment, PAT is used to translate private IP addresses into public ones. By providing a NAT accounting log, unequivocal user identification can be provided.

Although many of the examples herein relate to IP conservation, the teachings herein support alternative embodiments, for example, including those that do not provide or otherwise support NAT translation. In order to support a limited or otherwise reduced number of IP addresses, a less complex and expensive embodiment is supported by simply assigning independent public IP addresses to users connected at any given time, instead of translating private IP addresses via NAT and sharing one or more public IP addresses.

In addition, the infrastructure in an embodiment provides substantial redundancy for, for example, datacenter and communication providers. This supports significant availability and substantial scalability, for example, to support hundreds of thousands of concurrent users by adding network equipment that, for example, terminates the tunnels at configured routers. In case of a lower number of concurrent users, the system is adjustable to scale appropriately in terms of functionality and cost.

In an embodiment, the present application employs regards the extensible authentication protocol ("EAP"), an authentication framework that is frequently used in wireless networks and Point-to-Point connections. EAP is widely used, for example, in IEEE 802.11 (Wi-Fi), and WPA and WPA2 standards have adopted IEEE 802.1X with multiple EAP types for authentication mechanisms. When used as an authentication protocol, EAP is usable on the captive portal, and is suitable when used with WPA and/or WPA2. For example, LEAP (Lightweight-EAP), EAP-TLS, EAP-TTLS, EAP-FAST, EAP-SIM, EAP-AKA are applicable in association with one or more credentials and/or processes. In an embodiment, 802.1X involves a supplicant (e.g., a mobile computing device such as a smartphone, PDA or the like), an authenticator (e.g., a configured router) and a server. 802.1X is used to transport EAP messages via EAP over Lan ("EAPOL") from a supplicant to an authenticator, and thereafter via RADIUS/Diameter from authenticator to the server.

In at least one known system, such as employed by systems and methods described in commonly assigned U.S. Pat. No. 7,924,780 and U.S. Pat. No. 7,995,993, three actors are employed: a supplicant, an authenticator and a server. In such embodiment(s), a universal access method ("UAM") is used to transport password authentication protocol ("PAP") messages. Thereafter, HTTPs may be used for transporting data from supplicant to a UAM Server, HTTP is used from supplicant to authenticator, and RADIUS is used from Authenticator to Server.

In accordance with an embodiment in accordance with the present application that employs tunneling, three actors are similarly employed, a supplicant, an authenticator and a server that may include a plurality of elements. In one embodiment, for example, EAP messages are transferred from EAPOL to PPP and then to RADIUS. In an alternative embodiment, a tunneling "on demand" architecture is employed, which eliminates a step of converting EAPOL to PPP, and that may be easier for manufacturers to implement. In the alternative embodiment, a proxy RADIUS (that may be modified to trigger the PPP authentication) is employed, or a modified EAP daemon may be applied. Each of these two embodiments are discussed in greater detail below, in connection with FIGS. 11, 12 and 13.

Referring now to the drawing figures, in which like reference numerals represent like elements, FIG. 1 illustrates an example hardware arrangement in accordance with an embodiment of the present application. Referred to generally, herein, as system 100, the arrangement provides for bandwidth sharing services in accordance with the teachings herein. System 100 includes at least one information processor 102 (which may be configured to operate as an Internet web server and/or database file server) that is programmed and configured to access communication network 106 and communicate with computing device(s) 104. Computing devices 104 may be personal computers, and may further be mobile devices, such as operating one or more of the GOOGLE ANDROID, APPLE IOS, WINDOWS MOBILE operating systems, and may include smartphone devices, tablet computing devices, other mobile portable devices.

Continuing with reference to FIG. 1, LNS server 108 (which may operate substantially as a router) and RADIUS Server 110 are also illustrated, which are suitable for contributing to functionality described herein. Computing devices 104, information processor(s) 102, router 108 and/or server 110 may communicate via the known communications protocol, Transmission Control Protocol/Internet Protocol "TCP/IP." At least information processor 102 and computing device(s) 104 preferably are provided with or have access to all databases necessary to support the present application.

Communication network 106 is preferably a global public communication network such as the Internet, but can also be a wide area network (WAN), local area network (LAN), an intranet or other network that enables computing devices and peripheral devices to communicate.

In a preferred embodiment, information processor(s) 102 and computing devices 104 are preferably equipped with web browser software, such as MICROSOFT INTERNET EXPLORER, MOZILLA FIREFOX, APPLE SAFARI or the like. Information processor 102 and computing devices 104 are coupled to communication network 106 using any known data communication networking technology.

Figure 2:
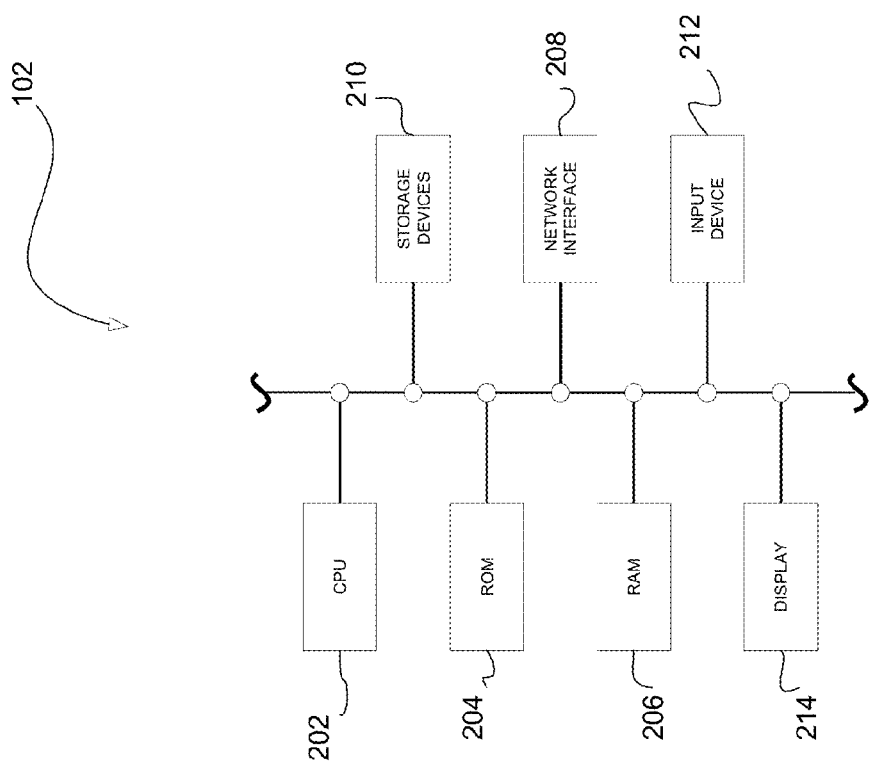
FIG. 2 illustrates functional elements, of which one or more may be configured in a computing device in accordance with an embodiment.

FIG. 2 illustrates functional elements, of which one or more may be configured in an example information processor 102 and/or computing device 104. The functional elements shown in FIG. 2 include one or more central processing units (CPU) 202 used to execute software code and control operations. Other elements shown in FIG. 2 include read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code databases and application data, one or more input devices 212 such as a keyboard, mouse, track ball, microphone and the like, and a display 214.

The various components illustrated in FIG. 2 need not be physically contained within a single device chassis or even located in a single location. For example, storage device 210 may be located at a site that is remote from the remaining elements of information processor 102, and may even be connected to CPU 202 across communication network 106 via network interface 208. Information processor 102 and/or computing device 104 may include a memory equipped with sufficient storage, such as to provide or access the necessary databases, forums, and other community services communicating hypertext markup language (HTML), Java applets, Active-X control programs. Information processor 102 and/or computing device 104 are arranged with components, for example, those shown in FIG. 2, suitable for the expected operating environment. The CPU(s) 202, network interface(s) 208 and memory and storage devices are selected to ensure that capacities are arranged to accommodate expected demand.

The nature of the present application is such that one skilled in the art of writing computer executable code (i.e., software) can implement the functions described herein using one or more of a combination of popular computer programming languages and developing environments including, but not limited to, C, C++, Visual Basic, JAVA, HTML, XML, ACTIVE SERVER PAGES, JAVA server pages, servlets, MYSQL and PHP.

Although the present application is described by way of example herein and in terms of a web-based system using web browsers and a web site server (e.g., information processor 102), system 100 is not limited to such a configuration. It is contemplated that system 100 is arranged such that information processor 102 and/or computing devices 104 communicate with and outputs data using any known communication method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on information processor 102 and/or computing device 104, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, WINDOWS VISTA, WINDOWS 7, MAC OS, UNIX, LINUX, PALM OS, POCKET PC, BLACKBERRY, ANDROID, IOS and any other suitable operating system.

Figure 3:
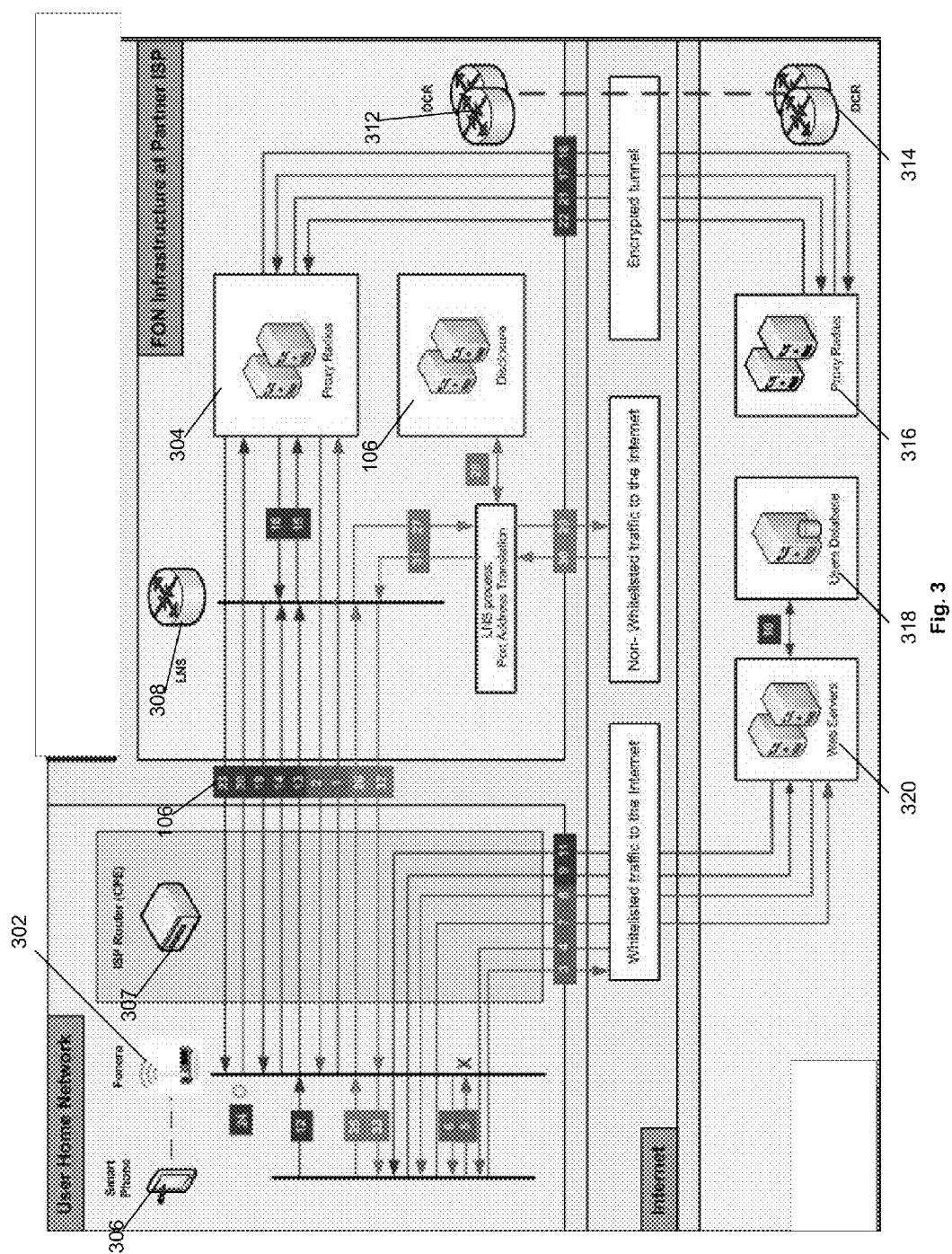
FIG. 3 illustrates a plurality of devices supporting a secure tunneling environment in accordance with an embodiment.

FIG. 3 illustrates a plurality of devices supporting a secure tunneling environment in accordance with an embodiment and identifies respective communication flows associated therewith. As shown in the example embodiment in FIG. 3, configured router 302 sends a RADIUS request to RADIUS proxy server 304 for, for example, configuration profile information therefrom, including for example white-listed domains, welcome page uniform resource locator ("URL"), L2TP server ("LNS") details, or the like (step 9). In an embodiment, RADIUS proxy server provides authentication and accounting for users requests, as well as configured router 302 configuration requests. In response, RADIUS proxy server 304 sends configuration profile information to configured router 302 (step 2). In the event that a hypertext transport protocol ("HTTP") request is sent to a domain that a user is allowed or otherwise authorized to access (a "white-listed" domain), configured router 302 forwards the request to the user, which translates the traffic via NAT with the router's public IP address and will forward it to the Internet (step 3). The HTTP reply is transmitted sent to the user's web browser software application (step 4).

At step 5, the user tries to connect to a web server which is not whitelisted (prior authentication is required) using the HTTP protocol. At step 6, configured router 302 (illustrated as "Fonera") redirects the user to the captive portal (web server 320) using the HTTP protocol. This occurs in an embodiment where the web authentication is used. At steps 7 and 8, the user device 306 requests the captive portal, via the HTTPs protocol, and the web server 320 sends it, including a login form. At step 9, user device 306 sends credentials, preferably via the password authentication protocol ("PAP") to web server 320, which checks the credentials with a local or remote database or system (step 10), and may use any suitable protocol that is defined between the two systems. Another HTTPs redirect is built, for example, with a one time password that user device 306 uses later to establish the tunnel.

Once the user credentials have been validated, the tunnel establishment process begins. User device 306 sends the received one time password to configured router 302 via the HTTP protocol (step 12). Configured router 302, thereafter, starts an L2TP layer 2 tunnel (step 13) and a PPP session (step 14) on top of it using the one time password, with the LNS server(s) 308. The LNS server(s) 308 converts the authentication request into a RADIUS communication with a Proxy RADIUS 304 (step 15), which forwards the credentials to a final RADIUS server 316 (step 16), which validates the one time password. The communication between 304 and 316, in this embodiment, preferably occurs through a secure VPN tunnel in order to protect the authentication credentials when exchanged through the Internet. Moreover, DCRs 312 and 314 are used for providing this VPN.

Continuing now with reference to FIG. 3, after a successful authentication message (Access-Accept) is sent from RADIUS server 316 to Proxy RADIUS 304 (step 17), the message is sent to LNS RADIUS 308 (step 18) which notifies configured router 302 that the credentials are valid and the PPP session has been established correctly (step 19). Once established, traffic accounting is provided. For example, configured router 302 starts an accounting process by sending a RADIUS accounting start package to the Proxy RADIUS server 304 (step 20), which forwards the package to the RADIUS 316 (step 21). A reply from RADIUS server 316 (step 22) is sent to Proxy RADIUS server 304, which sends the reply to configured router 302 (step 23).

At this point in the process, the user is already authenticated, and can freely connect to the Internet using the established tunnel. At step 24, configured router 302 has received a positive authentication confirmation from the LNS Server 308 (see step 19), and rules (including NAT or PAT, when appropriate) are enforced to put traffic of the user device 306 into the recently established PPP session. Thereafter and from this point forward, the user is authenticated and can freely navigate to any server on the Internet, however the traffic is routed through the tunnel.

Continuing with reference to FIG. 3, tunneled and potentially tapped/mirrored traffic is illustrated. In the example shown in FIG. 3, user traffic is sent through the tunnel when the user requests access (step 25) to any server on the internet (for example, HTTP, SMTP, VoIP, or the like). Configured router 302 forwards the request and subsequent traffic into the PPP tunnel (step 26) and sends it to LNS server 308. LNS server 308 may do a public address translation ("PAT") if configured to do so (step 27), and may additionally inject (mirror or duplicate) the user traffic into a mediation device (step 28). The mediation device may be a system that can be accessed or configured to give access, for example, to law enforcement personnel or other agency that requires mirroring of the user traffic on-demand. Moreover, user traffic is routed to its final destination (the server that was originally requested) (step 29). This communication pathway works in the reverse, as well, (incoming traffic mirrored to the mediation device as appropriate, finally to the end user device on (steps 30-33).

Thus, and as described in connection with the above example embodiment, the teachings herein provide for a user connection flow that includes access to white-listed and non-white-listed domains, and user authentication and authorization, including web server authentication, tunnel authorization and captive portal authorization.

In an embodiment, an integration of at least three session accountings is included. One is a PPP session accounting that is by one or more RADIUS servers 110. A second is a captive portal session accounting that is generated by RADIUS server(s) 110. A third is a NAT accounting, that is provided by LNS server 108. The PPP session accounting may include at least a user's session start time, stop time and the respective LNS's IP address where the PPP session finishes. The PPP session accounting may also include customer premises equipment ("CPE") 307, such as a router device provided to a user by the user's Internet service provider ("ISP"), assigned IP address which is included in the tunnel IP source for the LNS, because CPE 307 is translating (NAT) Configured router wide area network ("WAN") IP address. In an embodiment, CPE 307 includes a router and/or internet access point for Internet connectivity. Other information included in the PPP session accounting is the private IP address assigned to the Configured router by the LNS for the PPP session, the user's username, the type of accounting packet and the FON unique session identifier, which may be the same for a captive portal session.

In an embodiment, a captive portal manages user authorization and accounting at configured router 302. The captive portal sessions accounting preferably includes one or more of: the user's session start time, the session stop time, the user's username, the user's device type (Smart Phone, etc) and media access control ("MAC") address, the user's CPE 307 MAC address, the user's computing device (Smart Phone, etc) IP address, assigned by the Configured router via DHCP and a unique session identifier (same as described above in connection with the for the PPP session).

Moreover, the NAT translation sessions accounting is generated by LNS server 108 and includes one or more of: the translation creation time, the translation deleting time, the type of accounting (e.g., NAT Creation or NAT Deletion), the layer 4 communication protocol (UDP or TCP), the PPP session IP address (internal address) and the port, the LNS public IP address used for the translation and the port, and the Internet IP address that the user is reaching, and the port.

Thus, in accordance with the respective sessions accountings, user tracking and identification is provided. For example, the user's public IP address, TCP or UDP port, and a timeframe are known in advance. Using that information, the present application locates the private IP address that is assigned to the PPP session, which relates to a single PPP session, provided the time frame is appropriate (i.e. given a 24 h time frame, there may be several PPP sessions which have shared the same private IP address at different times). Moreover, using the PPP session IP address, the PPP session accounting for that IP address can be determined, and the user's username and CPE 307 address can be determined.

Moreover, in case further information is required (i.e, user device's MAC address) the Unique-Session-ID can be obtained and the Captive Portal's user session, which has the same Unique-Session-ID, can be located. The user device's MAC address and the Configured router's MAC address can, therefore, be identified.

The teachings herein provide for a "live platform" that includes a modular design in order to facilitate scalability and redundancy. In an embodiment, an LNS sub-platform terminates the L2TP PPP tunnels that are originated at the configured routers 302. The LNS sub-platform may also assign a private IP addresses to the users' sessions, translate private IP addresses into public ones, generate NAT accounting and forward it to an external Syslog, authenticate users' sessions by using RADIUS protocol and generate sessions accounting by using RADIUS protocol.

An information technology ("IT") services sub-platform may also be provided including one or more configured router/firewall that may provide encrypted tunnels (Gre/IP-Sec) with the platform for secured RADIUS authentication and other transactions. The IT services platform may also implement one or more firewall capabilities in order to protect the servers installed at the datacenters. The IT services platform may also include a RADIUS proxy server that, in an embodiment concentrates RADIUS authentication and accounting, and forwards information relating thereto to the RADIUS server 110 that is maintained or managed by provider or proprietor of the system and method in accordance with the teachings herein, and which may be located anywhere in the world. Further, a monitoring server may be included that is configured to check the health status of the network and server devices, and to forward the information to a centralized monitor platform, which may be maintained or managed by provider or proprietor of the system and method in accordance with the teachings herein. Moreover, a disclosure server may be included that stores information required for a disclosure action (RADIUS logs, NAT accounting, etc), and that provides a secured web interface for data extraction.

In addition to the LNS sub-platform, border switches, the platform described herein is configured to aggregate traffic from the LNS and IT Services sub-platform, as well as to provide IP connectivity with the ISP aggregation platform, and to provide inter-datacenter connectivity for redundancy purposes.

In an alternative embodiment, PPPoE technology may be substituted for PPP and L2TP. Moreover, a single customer provided equipment from an ISP (e.g., "CPE") device may be substituted for a combination of a second router device (e.g., configured router 302) and a "CPE." This embodiment is more efficient and less costly, for example, due to a reduction in equipment.

Figure 4:
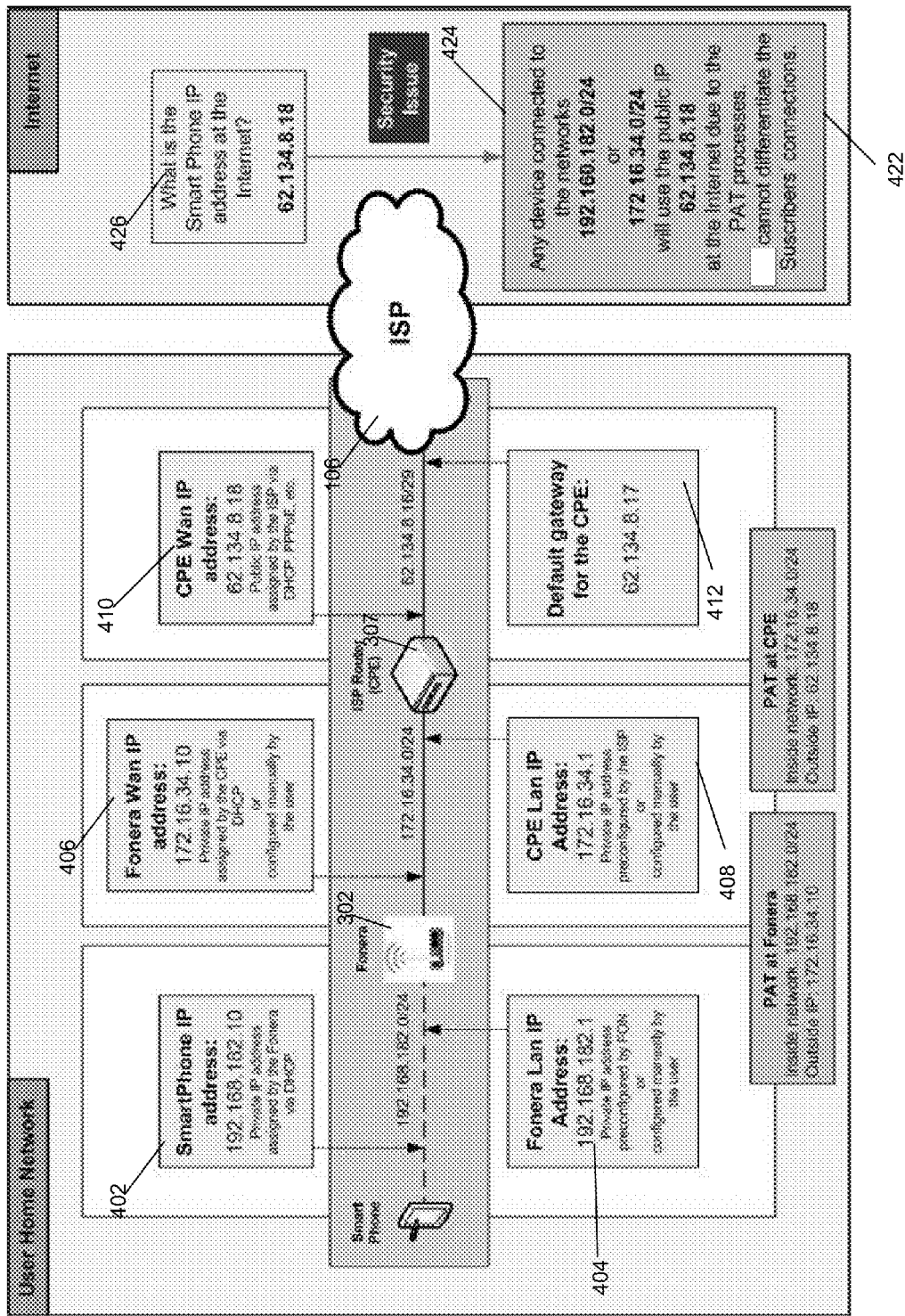
FIG. 4 illustrates assignments of IP addresses in accordance with an embodiment, prior to establishing a L2TP tunnel.
Figure 5:
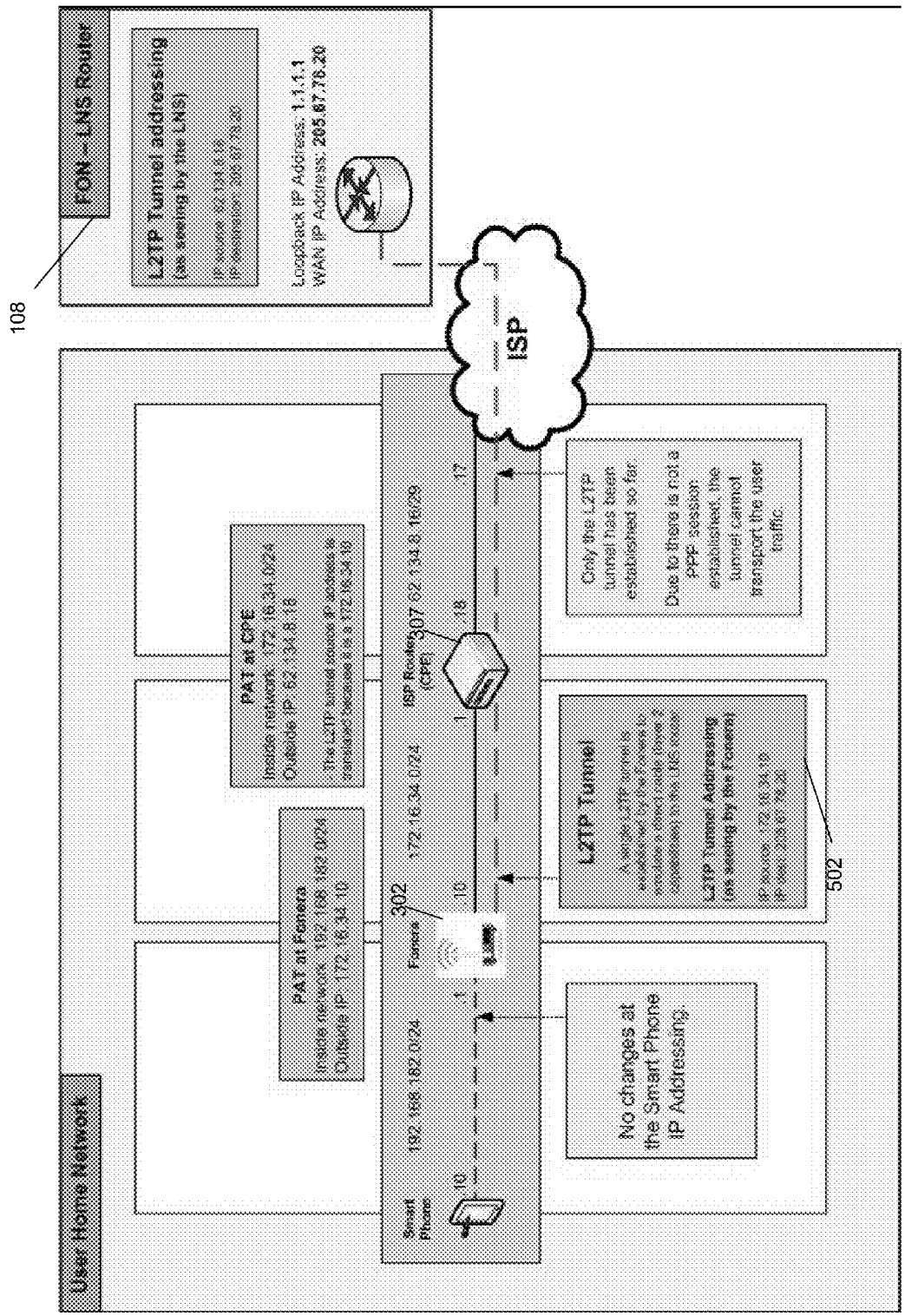
FIG. 5 illustrates assignments of IP addresses in accordance with an embodiment, once a L2TP tunnel has been established, and prior to a PPP session being established.
Figure 6:
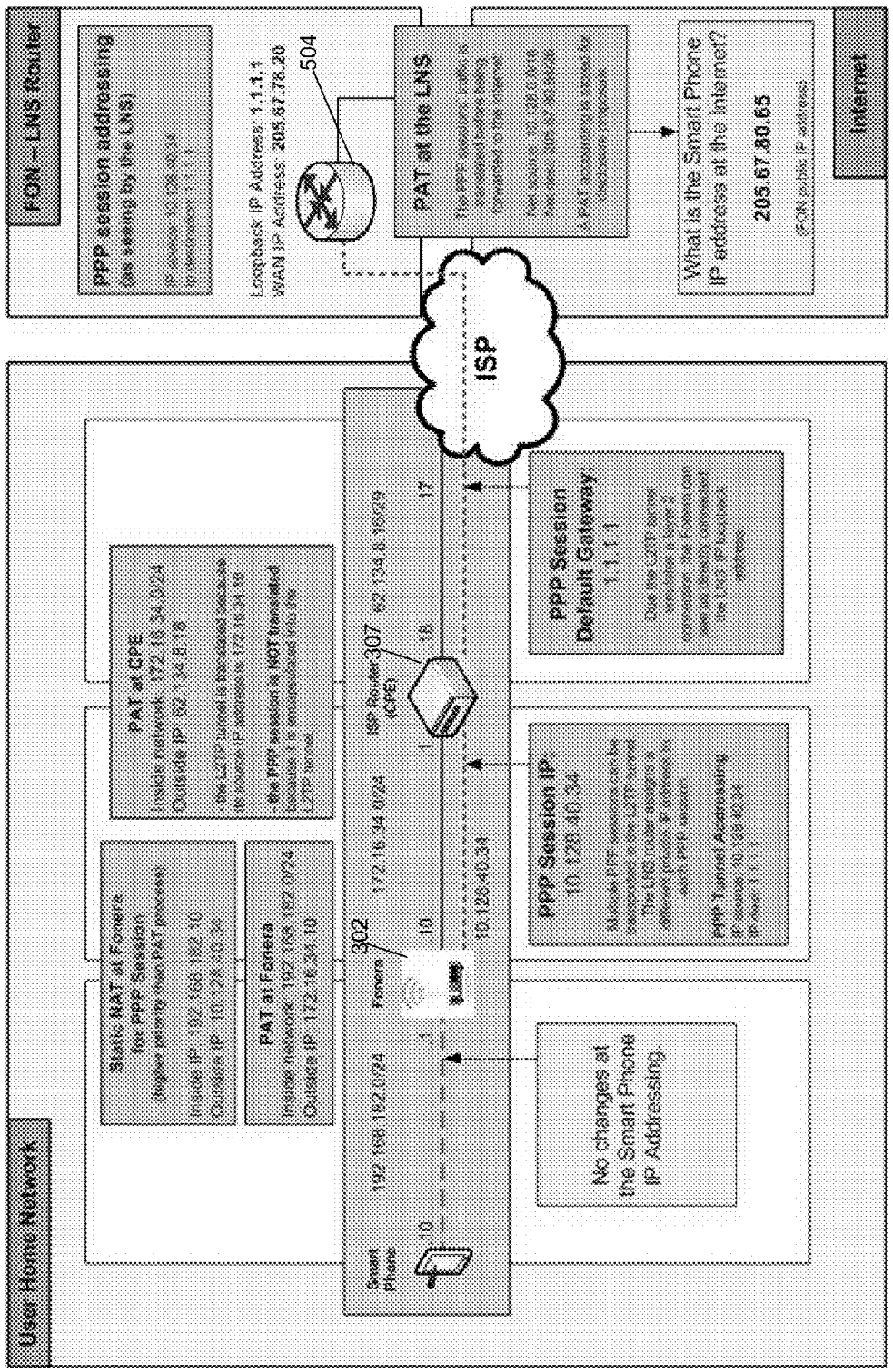
FIG. 6 illustrates assignments of IP addresses in accordance with an embodiment in which a L2TP tunnel and the PPP session are both established.
Figure 7:
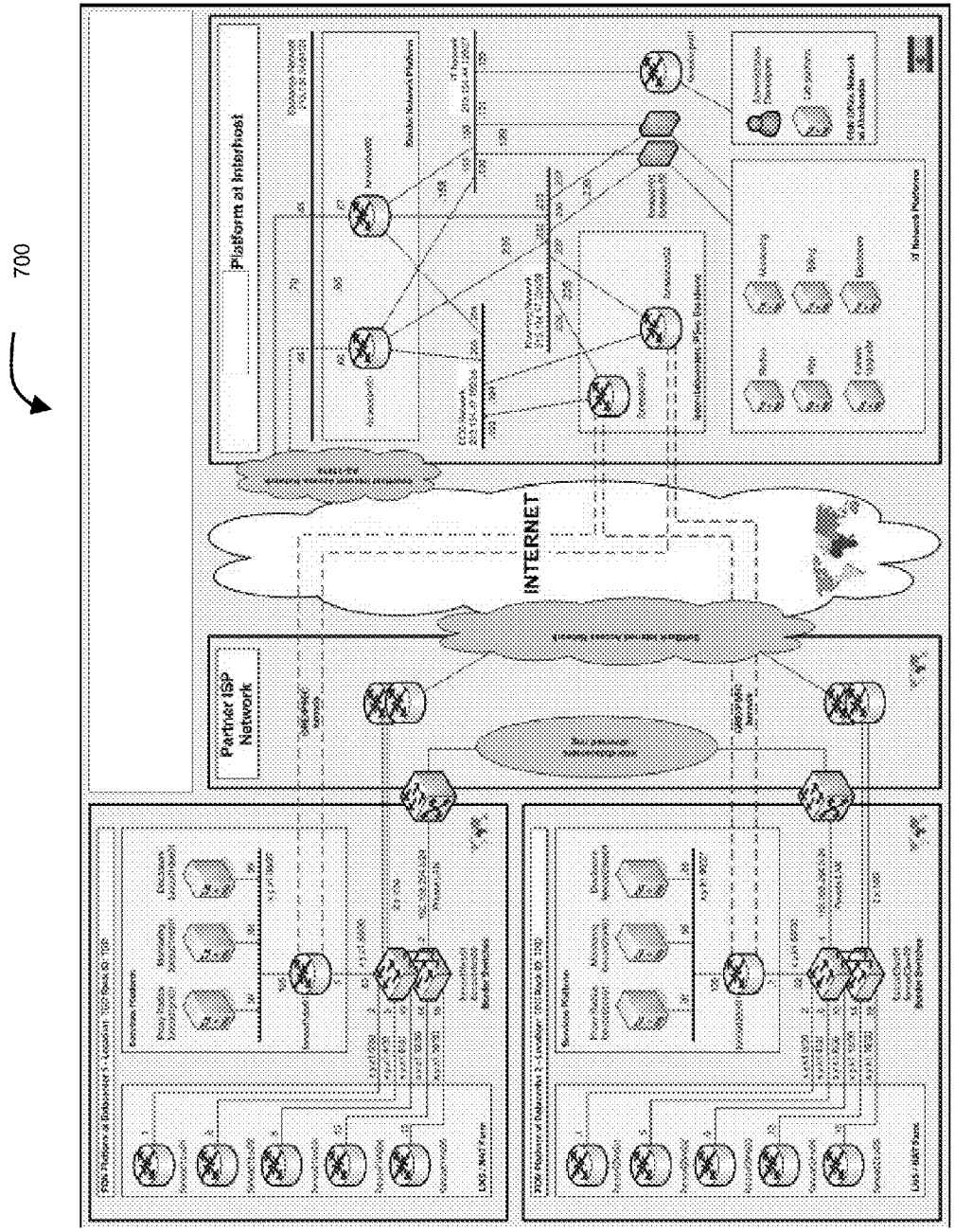
FIGS. 7-10 illustrate example hardware infrastructures that represent redundancy, in accordance with four embodiments in accordance with the teachings herein.
Figure 8:
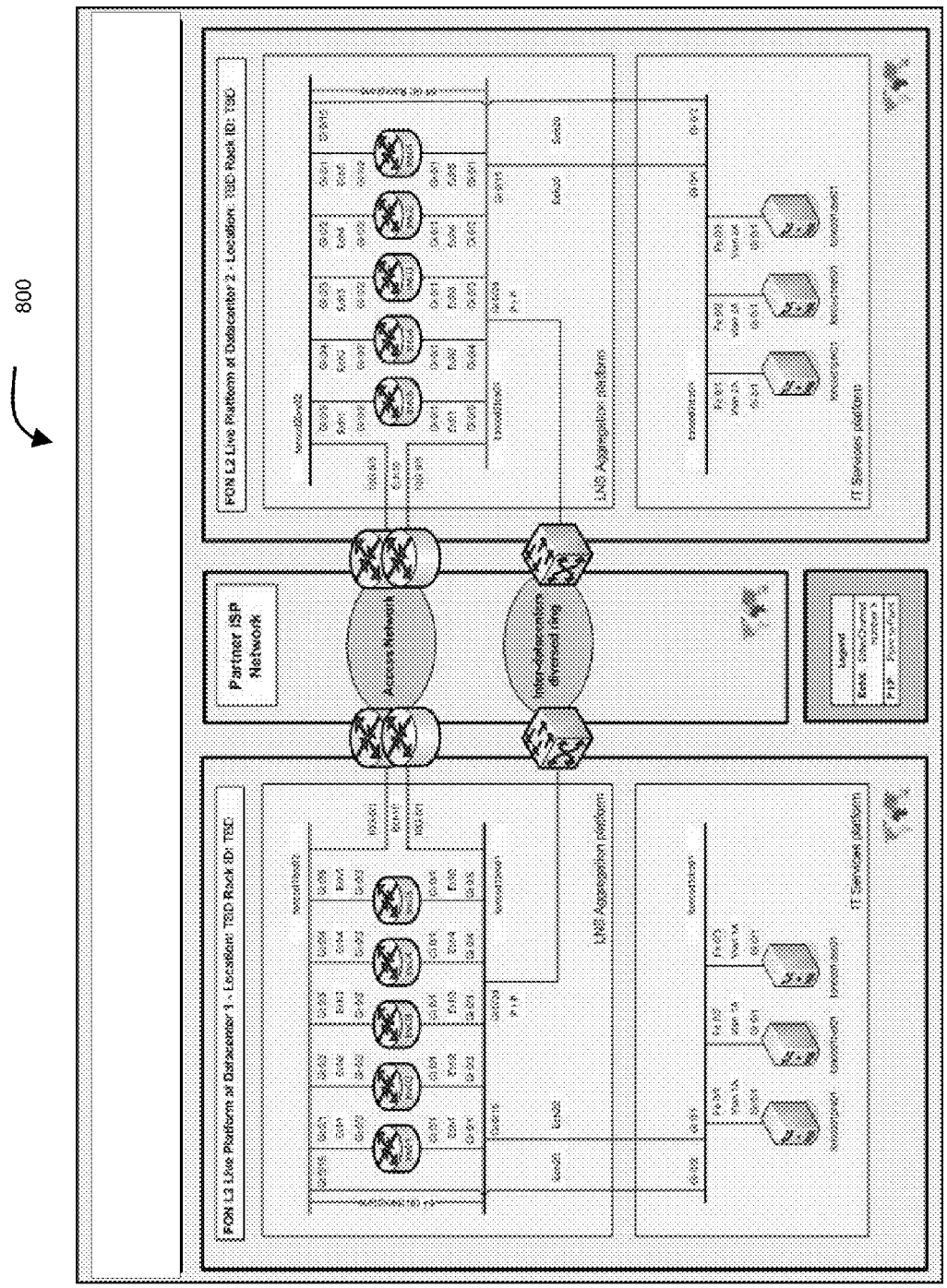
Figure 9:
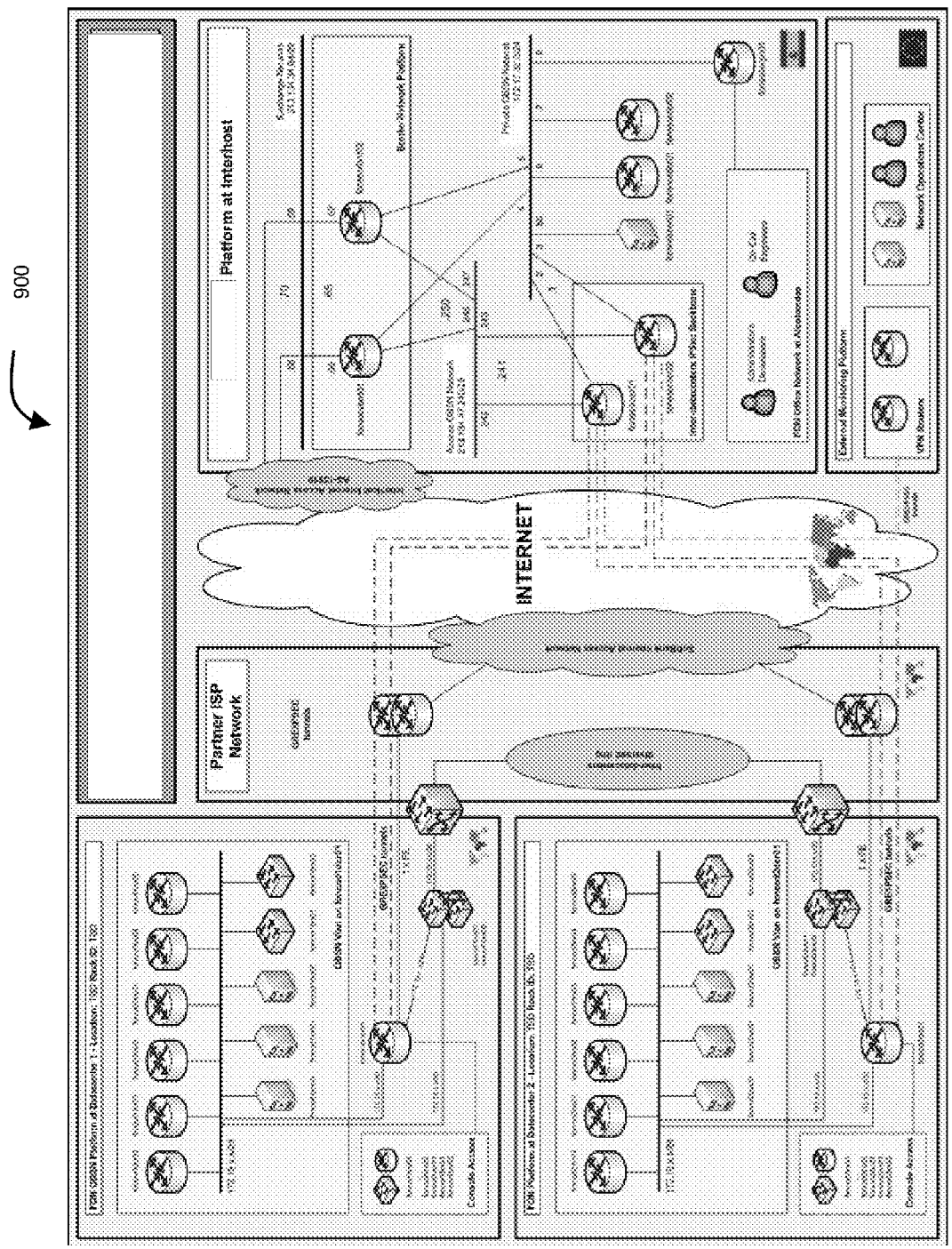
Figure 10:
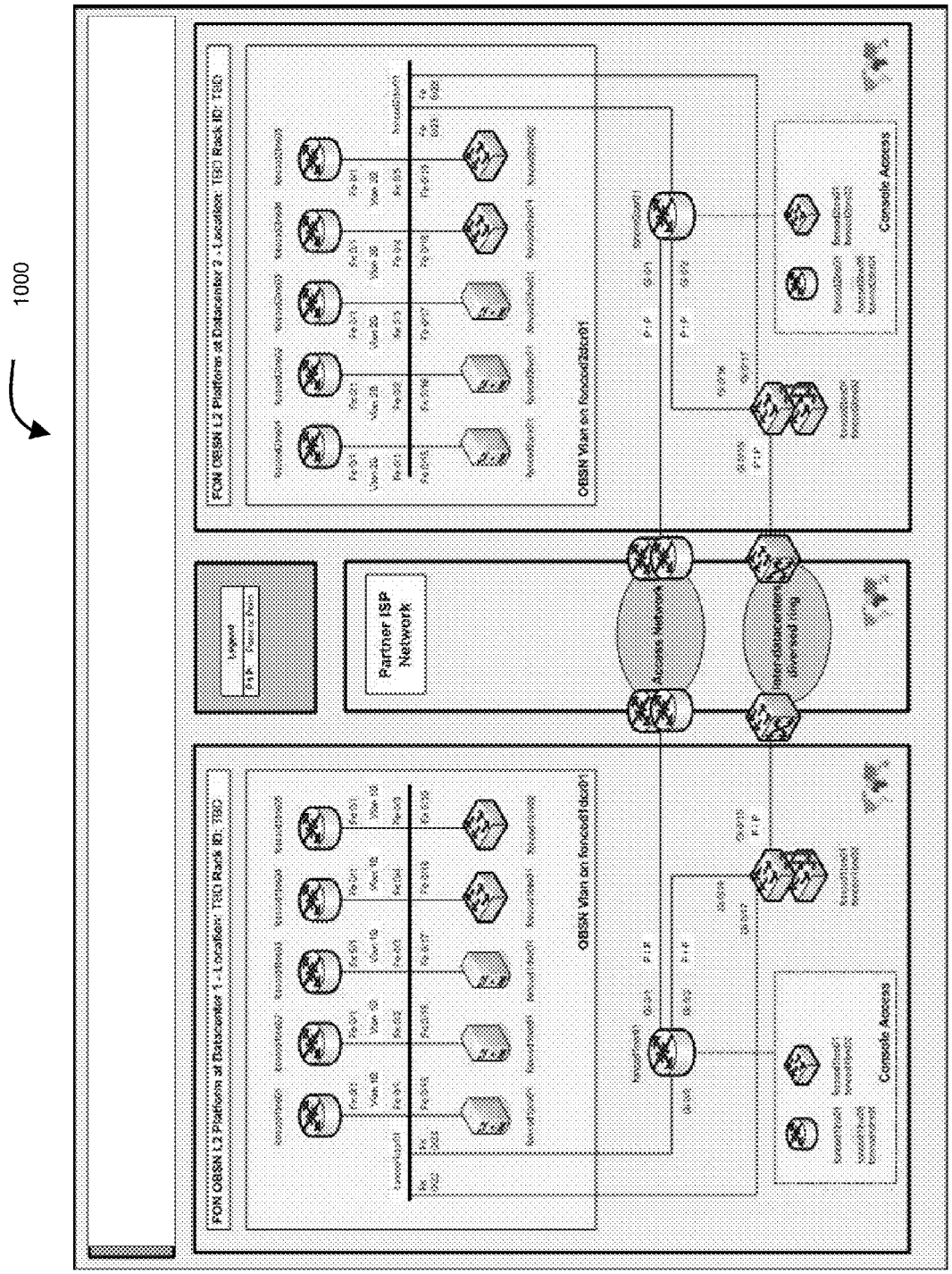

FIGS. 4-6 illustrate example flows of information between hardware devices in a "live platform" in connection with IP addressing and in connection with an embodiment.

FIG. 4 illustrates assignments of IP addresses in accordance with an embodiment, prior to establishing a L2TP tunnel. A plurality of IP addresses are assigned for respective user devices of the present application. In the example shown in FIG. 4, IP address 402 (illustrated as 192.168.182.10) is a private IP addressed that is assigned by configured router 302 for a device, such as a cellular telephone that is configured with Internet access (e.g., a "Smart Phone"), a personal digital assistant (such as an IPOD TOUCH), or tablet computing device that may be configured with 3G or 4G, and/or WI-FI connectivity, or any other suitable device. IP address 404 (illustrated as 192.168.182.1) is a private IP address that is assigned for configured router 302, and applicable for a user's local area network ("LAN"). IP address may be preconfigured 404 (e.g., distributed to a user in a preconfigured state) or may be configured, such as by a user, at the user's premises. Outside IP address 406 (illustrated as 172.16.34.10) is a private wide area network ("WAN") IP address for configured router 302, which may be assigned by the CPE 307, for example, via DHCP. Alternatively, IP address 406 may be assigned, such as by a user, at the user's premises.

Continuing with reference to the example IP address assignments illustrated in FIG. 4, IP address 408 (illustrated as 172.16.34.1) is assigned to CPE 307 for the user's local area network ("LAN"). IP address 408 is shown as a private IP address that is assigned by the user's ISP, and CPE 307 may be preconfigured with the IP address, or otherwise configured at the user's premises. IP address 410 (illustrated as 62.134.8.18) is a wide area network ("WAN") public IP address that is assigned by the user's ISP, for example, via DHCP, Point to Point Protocol over Ethernet ("PPPoE"), or other suitable dynamic or static way. IP address 412 (illustrated as 62.134.8.17) represents the default gateway for CPE 307, provided by the user's ISP.

Thus, and as illustrated in FIG. 4, the PAT 414 at configured router 302 provides a range of "inside" network IP addresses, illustrated as 192.168.182.0/24, to connect to an "outside" IP address, illustrated as 172.16.34.10. The PAT 416 of CPE 307 provides a range of "inside" network IP addresses, illustrated as 172.16.34.0/24, to connect to an "outside" IP address 62,134.8.18. Thus and as illustrated in FIG. 4, any computing device, such as a smartphone, that is connected to a local area network within the IP address range 192.168.182.0/24, or the range 172.16.34.0/24, uses public IP address 62.134.8.18, set via CPE 307 and due to PAT processes. Under this example and prior to establishing an L2TP tunnel, the respective connections and IP addresses of devices that are connected to the network(s) cannot be respectively ascertained.

FIG. 5 illustrates assignments of IP addresses in accordance with an embodiment, once a L2TP tunnel has been established, and prior to a PPP session being established. Prior to a PPP session, no IP addressing changes occur for smart phones or other nodes connected to the local area network within the IP address range 192.168.182.0/24. As described above with reference to FIG. 4, a PAT occurs at configured router 302, to outside IP address 172.16.34.10. Single L2TP Tunnel 502 is established by configured router 302 to emulate a direct (e.g., physical) connection (e.g., via cable, with layer 2 capabilities) to LNS Server. In the example shown in FIG. 5, the destination IP address is 205.67.78.20, the WAN IP address of LNS server 108. PAT at CPE 307 results in inside network 172.16.34.0/24 translated to outside IP address 62.134.8.18. The L2TP tunnel source IP address 410 is translated to the outside IP address 410 (FIG. 4). At this stage, only the L2TP tunnel is established, and no user traffic is transported because no PPP session has been established. LNS server 108 sees IP address 410 (illustrated as 62.134.8.18), and IP destination 205.67.78.20. Moreover, loopback IP address (1.1.1.1) is used for WAN IP address of LNS server 108 (illustrated as 205.67.78.20).

FIG. 6 illustrates assignments of IP addresses in accordance with an embodiment in which a L2TP tunnel and the PPP session are both established. Static NAT at configured router 302 for a PPP session occurs, which is deemed a higher priority than the previous PAT process that occurred prior to the PPP session. No IP addressing changes at end user devices, such as smartphones, for initial communication between the user devices and configured router 302. The PPP session IP address is defined (illustrated in FIG. 5 as 10.128.40.34). Multiple PPP session can be transported in the L2TP tunnel, and LNS server 108 may assign a different private IP address to each respective PPP session. Continuing with reference to FIG. 6, PPP tunnel addressing occurs, from IP source address (illustrated as 10.128.40.34) to IP destination 1.1.1.1 (e.g., for the IP loopback IP address). At configured router 302 (and as noted above with reference to FIG. 5), L2TP tunnel source IP address 410 is translated to the outside IP address 410 (FIG. 4). Preferably, once the L2TP tunnel is established, the PPP session IP address is not translated because the IP address is encapsulated into the L2TP tunnel. Thereafter, after a PAT process occurs CPE 307, a PPP session default gateway is defined. Due to the L2TP tunnel, a layer 2 connection is emulated, which configured router 302 can see as directly connected to LNS 504 IP loopback IP address. Thereafter, a PAT process occurs at LNS 504, and the PPP session's traffic is translated before being forwarded to the Internet for an eventual destination. In the example shown in FIG. 6, the network source IP address is within IP address range 10.128.0.0/16, and the network destination IP address is within IP address range 205.67.80.64/26. Thereafter, a PAT accounting is preferably stored, and the user device (e.g., smartphone) IP address at the Internet can be identified (illustrated as 205.67.80.65).

FIGS. 7-10 illustrates example hardware infrastructures 700, 800, 900 and 1000, respectively, that represent redundancy, in accordance with four embodiments.

Figure 11:
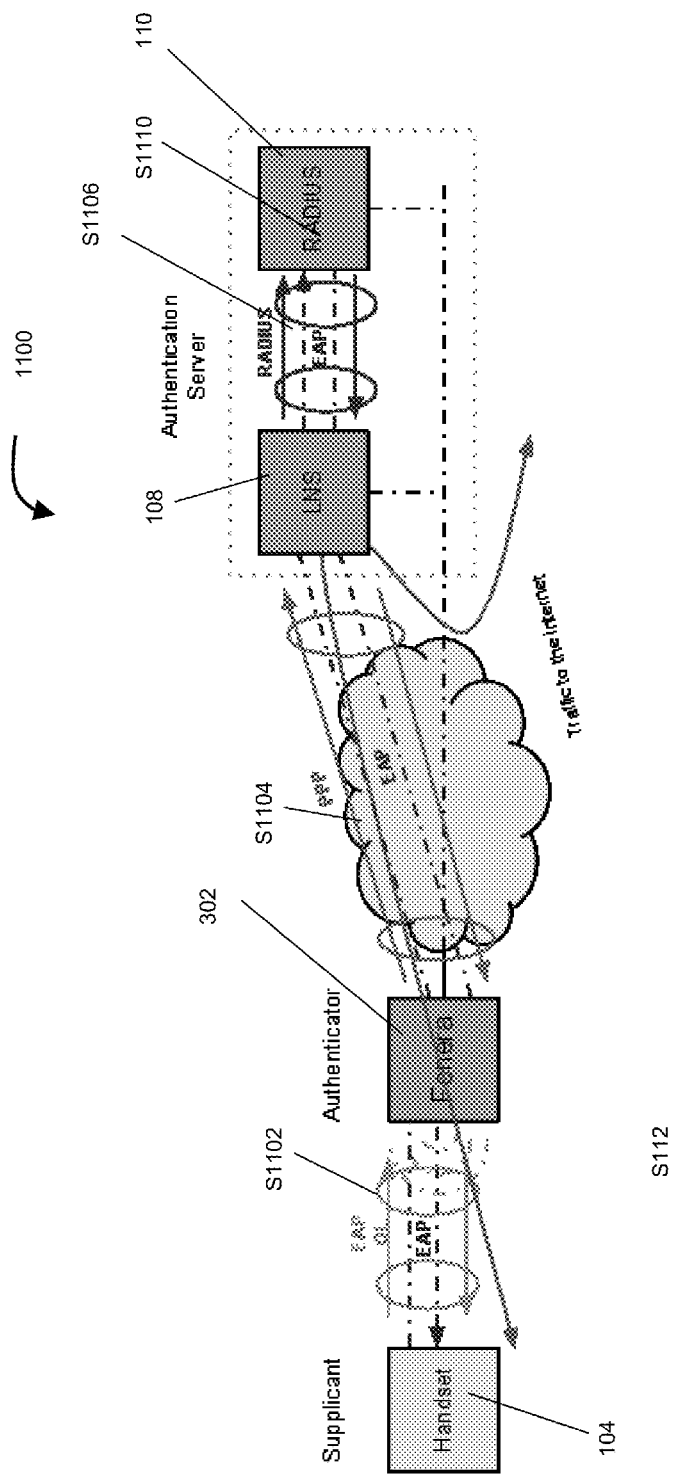
FIGS. 11-13 illustrate alternative hardware arrangements and corresponding data transmissions in accordance with the teachings herein.
Figure 12:
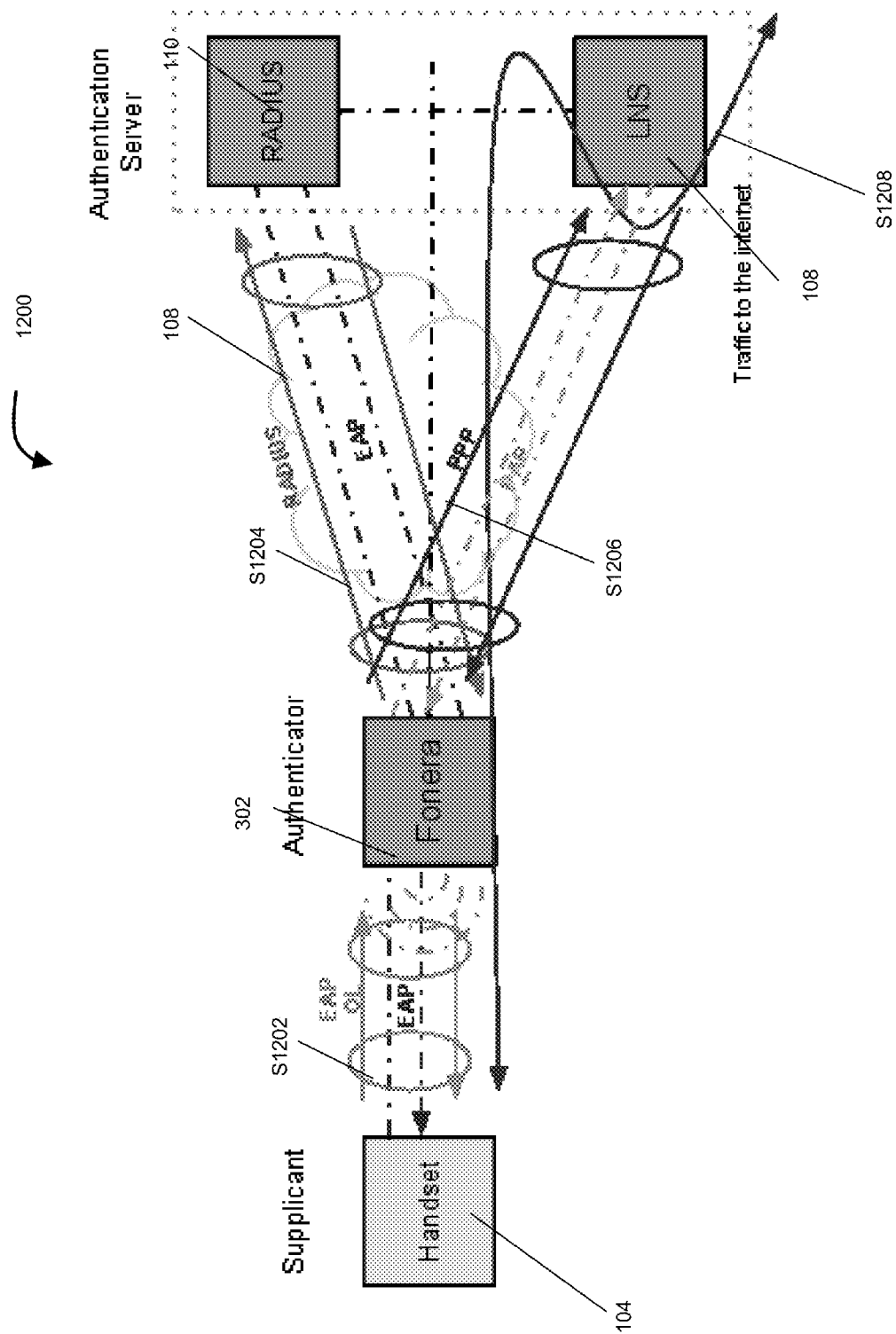
Figure 13:
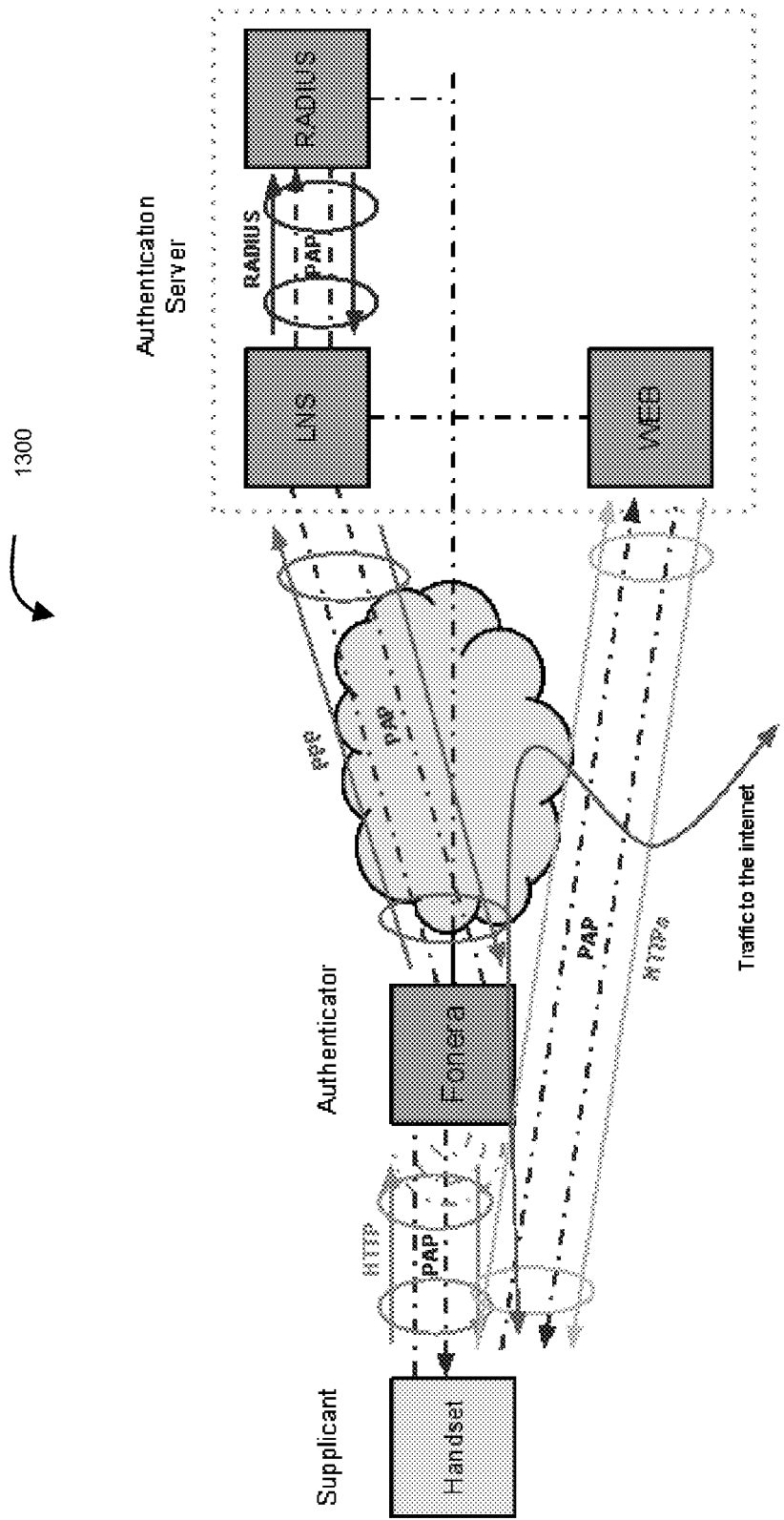

FIGS. 11-13 illustrate example embodiments in accordance the present application. As noted above, EAP may be used for transmitting credentials, such as for user authentication. In known systems, however, EAP is not usable transmitting credential information from a mobile computing device, such as a smartphone, to an authenticating server, such as RADIUS server 110.

In an embodiment, data are encapsulated in one format and transmitted from one device, such as computing device 104 that is a smartphone, and then transmitted to another device that removes the EAP capsule, and encapsulates the authentication information using another protocol, for example, PPP, and transmit that to another device, for example RADIUS server 110. Once RADIUS server 110 receives the PPP encapsulated credentials, RADIUS server 110 authenticates the user using the authentication credentials (or does not authenticate due to improper credentials or other reason), RADIUS server 110 transmits a reply via PPP. The reply via PPP is received, opened and encapsulated back into EAP, before being transmitted back to computing device 104.

FIG. 11 illustrates an example hardware arrangement 1100, in addition to data transmissions and respective communication protocols employed therewith. As shown in FIG. 11, authentication happens in one phase. The user using handset 104 tries to associate using 802.1x (EAPOL) and sends EAP messages encapsulated in this protocol (step S1102). Configured router 302 transforms the EAP messages from EAPOL to PPP and sends them to the LNS (step S1104). LNS server 108 transforms the EAP messages from its PPP capsule to a RADIUS capsule and forwards them to the RADIUS server 110 (step S1106).

Thus, and as illustrated in FIG. 11, configured router 302 receives credential information in the EAPOL capsule, removes the EAPOL capsule and encapsulates the credential information into PPP and transmits it to LNS server 108. LNS server 108 receives the PPP packet and forwards the EAP credential information via the RADIUS protocol to RADIUS server 110. The successful authentication implies that a PPP/L2TP tunnel has been established between the router 302 and the LNS server 108. The tunnel is specific to the user handset 104 and all the traffic to and from this device will be routed through the tunnel until the session stops.

FIG. 12 illustrates an example hardware arrangement 1200, in addition to data transmissions and respective communication protocols employed therewith. In the example shown in FIG. 12, the tunnel establishment happens in two phases. Phase one regards user authentication. The user tries to associate a signal using 802.1x (EAPOL) and sends EAP messages encapsulated in this protocol (step S1202). Configured router 302 transforms the EAP messages from the EAPOL capsule and puts them in a RADIUS format and sends them directly to the RADIUS server 110 (step S1204). At phase two, in case the user is authenticated, for example by RADIUS server 110, RADIUS server 110 optionally sends back a one time password to configured router 302, which uses it to establish a L2TP/PPP tunnel with the LNS 108 which will then be used to route the user's traffic (step S1206).

Thus and in connection with FIG. 12, user device 104 has the user credentials (not shown) and starts an association with the configured router 302 using the 802.1x (EAPOL) protocol. EAP is used to transmit the messages that authenticate the user. The EAP messages may be different, depending on the type of EAP that is used (EAP-SIM, EAP-AKA, EAP-TTLS or other suitable type). Configured router 302 takes the EAP messages encapsulated in the 802.1x (EAPOL) and encapsulates them in a RADIUS packet that is sent to the RADIUS server for user authentication. RADIUS server 110 replies with new EAP messages (as known in the art, this process may occur more than once until the credentials are considered as validated) to LNS server 108 within a RADIUS encapsulation. Along with the accept message, an (optional) one time password may be sent to configured router 302. If RADIUS server 110 has sent the one time password (which may be identified in a parameter), configured router 302 builds a L2TP/PPP packet with the received one time password and establishes a PPP session to LNS server 108 (e.g., via a suitable authentication protocol, be it PAP, CHAP, EAP) (step S1208).

Continuing with reference to FIG. 12, after the RADIUS server 110 accept indication is received or after the PPP is established (as appropriate), configured router 302 forwards the EAP messages from RADIUS server 110 to the client device 104 and allows the association. Thereafter, traffic is forwarded to the Internet, using the tunnel, provided it was established.

FIG. 13 illustrates an example hardware arrangement 1300, in addition to data transmissions and respective communication protocols employed therewith. The embodiment illustrated in FIG. 13 is a simplified view of that shown and described above, with reference to FIG. 3.

Therefore, and in accordance with the teachings herein, a system and method are provided for identifying respective users that access a communication network via Wi-Fi or other shared bandwidth. Individual users of Wi-Fi service via shared public IP address(es) can be identified and disclosed, for example, to civil authorities.

Although the present invention is described and shown in relation to particular embodiments thereof, many other variations and modifications and other uses will become apparent to those skilled in the art. Thus, various embodiments and variations are shown and described herein, and it is preferred, therefore, that the present invention be limited not by the specific disclosure herein.

What is claimed is:

1. A method of providing internet access for a first user computing device, the method comprising:
   receiving, by a wireless gateway device, from the first user computing device, a request for the internet access;
   transmitting via the internet, by the wireless gateway device, to a second computing device remote from the wireless gateway device, a request to authenticate the first user computing device;
   only after receiving, by the wireless gateway device, a reply that authenticates the first user device, establishing a communication tunnel between the wireless gateway device and the second computing device,
   wherein the reply that authenticates is received from a remote authenticating computing device different and remote from the second computing device, and different and remote from the wireless gateway device;
   wherein after the communication tunnel is established, the method further comprises:
   receiving, by the wireless gateway device, data packets, and encapsulating each data packet; and
   providing, by the wireless gateway device, the internet access for the first user computing device by transmitting, through the communication tunnel, data received from the user computing device; and
   assigning, by the wireless gateway device, an internet protocol address for a communication session of the first user computing device.

2. The method of claim 1, wherein the first user device and the wireless gateway device communicate using HTTP.

3. The method of claim 1, wherein the first user device and the wireless gateway device communicate using EAP.

4. The method of claim 1, wherein the second computing device includes a layer 2 tunneling protocol network server ("LNS").

5. The method of claim 4, further comprising:
   reformatting, by the LNS, each encapsulated data packet; and
   transmitting via the internet, by the LNS, to a remote network platform device the reformatted data packet.

6. The method of claim 1, wherein the second computing device requests the authentication using RADIUS protocol.

7. The method of claim 1, wherein the second computing device is a RADIUS server.

8. The method of claim 1, wherein each encapsulated data packet is transmitted by the wireless gateway device using point-to-point protocol.

9. The method of claim 1, further comprising logging, by the second, device credentials and a session address.

10. The method of claim 1, further comprising:
    receiving, by the wireless gateway device, from a second user computing device different from the first user computing device, a request for the internet access;
    transmitting via the internet, by the wireless gateway device, to the second computing device, the request to authenticate the second user computing device;
    only after receiving, by the wireless gateway device, a reply that authenticates the second user device, establishing a communication session between the wireless gateway device and the second computing device,
wherein the reply that authenticates is received from the remote authenticating computing device;
wherein after the communication session is established, the method further comprises:
providing, by the wireless gateway device, the internet access for the second user computing device by transmitting, through the communication tunnel in the communication session, data received from the second user computing device; and
assigning, by the wireless gateway device, an internet protocol address for a communication session of the second user computing device so as to enable unambiguous discrimination of the second user computing device from the first user computing device.

11. The method of claim 1, wherein the wireless gateway device assigns, using Network Address Translation, a single internet protocol address to communications of the first user computing device and to communications of a second computing device different from the first user computing device,
wherein the second user computing device requests internet access via the wireless gateway device.

12. The device of claim 1, wherein the fourth module is configured to assign, using Network Address Translation, a single internet protocol address to communications of the first user computing device and to communications of a second computing device different from the first user computing device,
wherein the second user computing device requests interne access via the wireless gateway device.

13. A wireless gateway device that provides internet access for a first user computing device, the device comprising:
a first module configured to receive from the first user computing device, a request for the internet access;
a second module configured to transmit, to a second computing device remote from the wireless gateway device and connected to the wireless gateway device via the internet, a request to authenticate the first user computing device;
a third module configured to establish, only after receiving, by the wireless gateway device, a reply that authenticates the first user device, a communication tunnel between the wireless gateway device and the second computing device,
wherein the reply that authenticates is received from a remote authenticating computing device different and remote from the second computing device, and different and remote from the wireless gateway device;
a fourth module configured to receive, only after the communication tunnel is established, data packets, and encapsulating each data packet; and
the fourth module configured to provide the internet access for the first user computing device by transmitting, through the communication tunnel, data received from the user computing device; and
the fourth module configured to assign, by the wireless gateway device, an internet protocol address for a communication session of the first user computing device.

14. The device of claim 13, wherein the wireless gateway device communicates with the first user device using HTTP.

15. The device of claim 13, wherein the wireless gateway device communicates with the first user device using EAP.

16. The device of claim 13, wherein the each encapsulated data packet is transmitted using point-to-point protocol.

17. The device of claim 13, wherein the at least one second computing device includes a layer 2 tunneling protocol network server.

18. The device of claim 13, wherein:
the first module is configured to receive from a second user computing device different from the first user computing device, a request for the internet access;
the second module is configured to transmit via the Internet to the second computing device, the request to authenticate the second user computing device;
the third module is configured to establish, only after receiving a reply that authenticates the second user device, a communication session between the wireless gateway device and the second computing device,
wherein the reply that authenticates is received from the remote authenticating computing device;
the fourth module is configured to provide, only after the communication session is established, the internet access for the second user computing device by transmitting, through the communication tunnel in the communication session, data received from the second user computing device; and
the fourth module is configured to assign an internet protocol address for a communication session of the second user computing device so as to enable unambiguous discrimination of the second user computing device from the first user computing device.

\* \* \* \* \*